United States Patent
Nicolides et al.

(10) Patent No.: US 6,749,162 B2
(45) Date of Patent: Jun. 15, 2004

(54) BREAKAWAY BRACKET ASSEMBLY

(75) Inventors: Angelo S. Nicolides, Lindsay (CA); Alain Bourassa, Vimont (CA)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/256,287

(22) Filed: Sep. 27, 2002

(65) Prior Publication Data

US 2004/0061033 A1 Apr. 1, 2004

(51) Int. Cl.[7] ................................................. A47F 5/08
(52) U.S. Cl. .................................................. 248/231.9
(58) Field of Search ........................... 248/906, 231.9, 248/219.4, 229.15, 229.25, 229.26, 228.6; 220/3.9, 3.2, 3.92, 3.6

(56) References Cited

U.S. PATENT DOCUMENTS

| | | | |
|---|---|---|---|
| 1,961,728 A | 6/1934 | Arnest et al. ................. 247/19 |
| 3,131,901 A | 5/1964 | Coleman .................... 248/226 |
| 3,651,245 A | 3/1972 | Moll ........................... 174/51 |
| 3,734,438 A * | 5/1973 | Kautz ......................... 211/107 |
| 4,065,089 A * | 12/1977 | Frazier et al. ............... 248/245 |
| 4,399,922 A * | 8/1983 | Horsley ....................... 220/3.6 |
| 4,447,030 A * | 5/1984 | Nattel ........................ 248/27.1 |
| 4,483,453 A | 11/1984 | Smolik ........................ 220/3.5 |
| 4,572,391 A | 2/1986 | Medlin ........................ 220/3.9 |
| 4,732,356 A | 3/1988 | Medlin, Sr. ................. 248/27.1 |
| 4,787,587 A * | 11/1988 | Deming .................... 248/205.1 |
| 4,978,092 A * | 12/1990 | Nattel ...................... 248/205.1 |
| 5,031,789 A | 7/1991 | Dauberger .................. 220/3.4 |
| 5,386,959 A | 2/1995 | Laughlin et al. .......... 248/205.1 |
| 5,646,371 A * | 7/1997 | Fabian ......................... 174/58 |
| 5,703,327 A * | 12/1997 | Jorgensen .................... 174/53 |
| 5,810,303 A | 9/1998 | Bourassa et al. ......... 248/205.1 |
| 5,839,594 A | 11/1998 | Barbour ....................... 220/3.7 |
| 5,841,068 A * | 11/1998 | Umstead et al. .............. 174/58 |
| 5,965,844 A | 10/1999 | Lippa ........................... 174/49 |
| 6,098,945 A | 8/2000 | Korcz .......................... 248/343 |
| 6,378,821 B1 * | 4/2002 | McKelvy et al. .......... 248/218.4 |

* cited by examiner

Primary Examiner—Leslie A. Braun
Assistant Examiner—A. Joseph Wujciak, III
(74) Attorney, Agent, or Firm—Marcus R. Mickney; Alfred N. Goodman

(57) ABSTRACT

A bracket assembly in which two brackets are attached laterally adjacent one another on a support. A first bracket is adapted to be attached to a support having a face that has a first width. A first leg of the first bracket has a first removable portion and a first non-removable portion. The first leg has a second width that is larger than one half of the first width. A second bracket is adapted to be attached to the support laterally adjacent the first bracket. A second leg of the second bracket has a second removable portion and a second non-removable portion and also has a third width that is larger than one half of the first width. The first and second non-removable portions have fourth and fifth widths, respectively, which are each less than one half of the first width of the support for positioning the first non-removable portion of the first leg of the first bracket laterally adjacent the second non-removable portion of the second leg of the second bracket on the face of the support when the first and second removable portions have been separated from the first and second brackets.

27 Claims, 6 Drawing Sheets

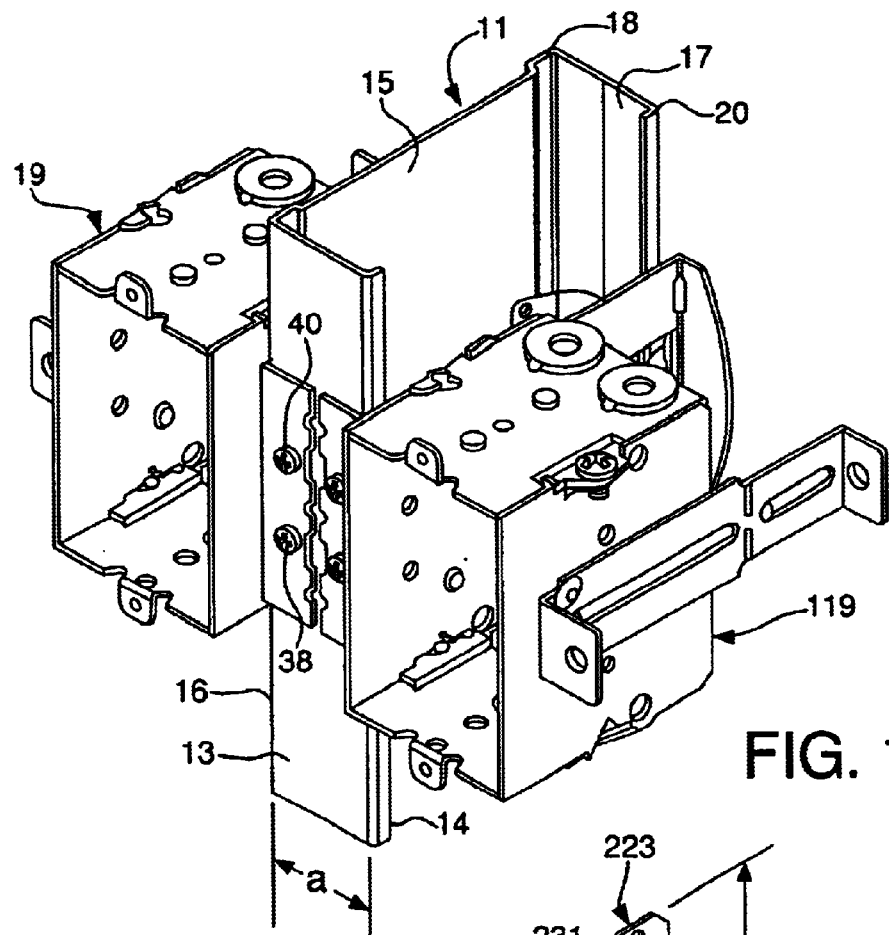
FIG. 1
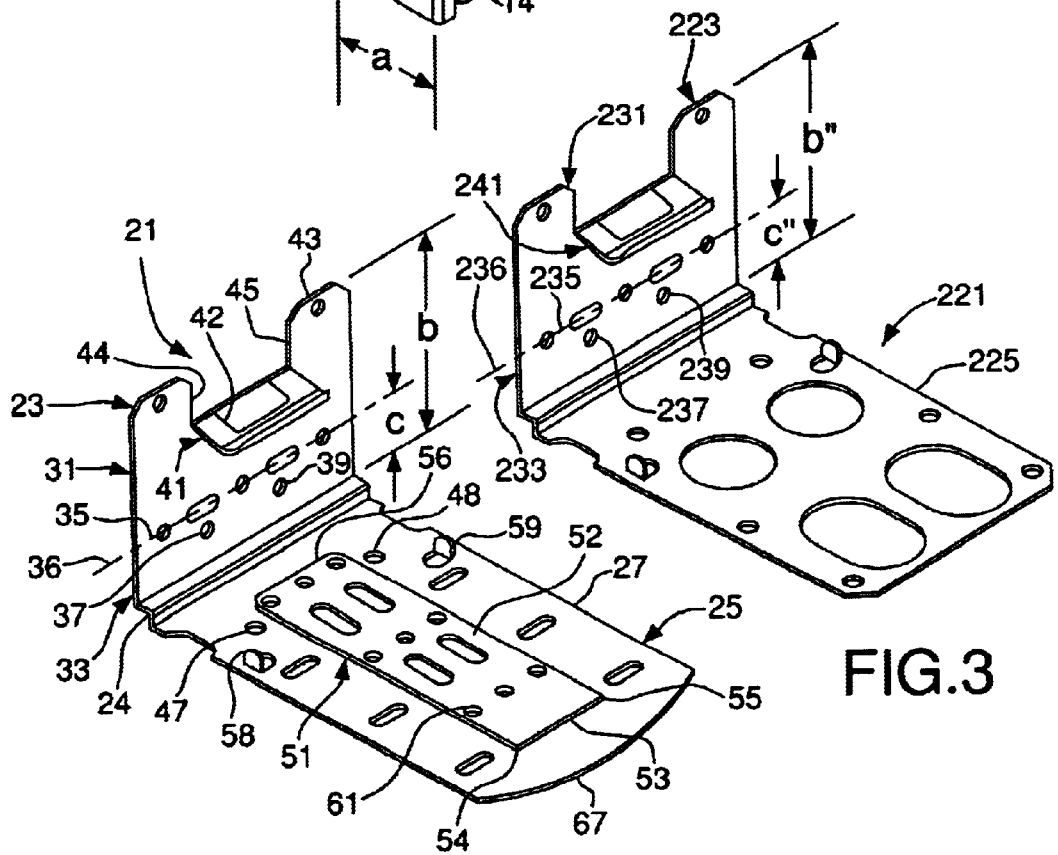
FIG. 2
FIG. 3

BREAKAWAY BRACKET ASSEMBLY

FIELD OF THE INVENTION

The present invention relates to a bracket having a removable portion for mounting two brackets adjacently on the same face of a support. More particularly, the present invention relates to a method of attaching a first bracket and a second bracket to the same face of the support without overlapping portions of the two brackets on that face of the support.

BACKGROUND OF THE INVENTION

Electrical boxes are often required to be mounted side by side on opposite sides of a steel stud. The electrical boxes are mounted on the stud with brackets, which are attached to the same face of the stud. Generally, the side of the stud to which the brackets are mounted is the side closest to where the drywall will be installed. Once a first bracket is secured to a face of the stud, portions of a second bracket secured to that same face of the stud overlap portions of the first bracket, thereby creating extra thickness on that face of the stud. When the drywall is installed, the extra thickness causes an unsightly and undesirable raised area at the sight where the brackets are attached to the stud. Elimination of the raised areas by the drywall installer requires special attention, which requires additional time and expense and hinders the construction process.

One prior solution to the problem of overlapping bracket portions is for the installer to manually cut and remove the overlapping portions of the bracket. The brackets are cut back such that the brackets meet near the center of the stud, thereby eliminating any overlapping portions of the brackets. However, this also greatly inconveniences the installer. First, the installer must find a tool capable of cutting the bracket material, and then the installer must estimate how much of the brackets must be trimmed so there will be no overlapping bracket portions. If the brackets are not trimmed enough, the installer must trim more of the brackets, thereby slowing the installation process even more. If the brackets are trimmed too much, the integrity of the attachment between the bracket and the stud may be compromised, thereby providing for weakly mounted electrical boxes.

For construction projects in which a large number of electrical boxes are to be installed, such as new condos and commercial buildings, extreme amounts of time are spent touching up raised drywall areas and trimming portions of brackets for the large number of electrical boxes mounted to studs in such projects. Furthermore, the extra time required to eliminate these problems greatly increases the cost of such projects.

A need exists for a bracket having an easily removable portion such that there is no overlap when mounting brackets side by side on the same face of a stud, thereby greatly reducing installation time and expense.

SUMMARY OF THE INVENTION

Accordingly, it is a primary object of the present invention to provide brackets having relatively easily removable portions for mounting two brackets laterally adjacent on the same face of a support without bracket overlap.

Accordingly, it is another object of the present invention to provide a method of attaching two brackets laterally adjacent on the same face of a support without bracket overlap.

The foregoing objects are basically attained by providing a bracket assembly that includes a first bracket adapted to be attached to a support having a face having a first width a, the first bracket having a first leg having a first removable portion and a first non-removable portion, the first leg having a second width b that is larger than one half of the first width; a second bracket adapted to be attached to the support, the second bracket having a second leg having a second removable portion and a second non-removable portion and also having a third width b'; and the first and second non-removable portions have fourth and fifth widths c and c', respectively, which are less than one half of the first width a of the support for positioning the first non-removable portion of the first leg of the first bracket laterally adjacent the second non-removable portion of the second leg of the second bracket on the face of the support when the first and second removable portions have been separated from the first and second brackets.

The foregoing objects are also attained by providing a method of attaching brackets adjacent one another to a face of a support, including the steps of removing a first removable portion from a first non-removable portion of a first leg of a first bracket, the first leg of the first bracket having a second width b and the first non-removable portion of the first leg of the first bracket having a fourth width c less than one half of the first width a of the face of the support; attaching the first bracket to the support; removing a second removable portion from a second non-removable portion of a second leg of a second bracket, the second leg having a third width b' and the second non-removable portion of the second bracket having a fifth width c' less than one half of the first width a of the support; and attaching the second bracket to the support such that the second non-removable portion of the second leg of the second bracket is positioned laterally adjacent the fist non-removable portion of the first leg of the first bracket on the face of the support.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings that form a part of the original disclosure:

FIG. 1 is a perspective view of first and second brackets according to a first embodiment of the present invention attached to a support;

FIG. 2 is a perspective view of the bracket of FIG. 1;

FIG. 3 is a perspective view of a bracket according to a second embodiment of the present invention;

DETAILED DESCRIPTION OF THE INVENTION

Figure 4:
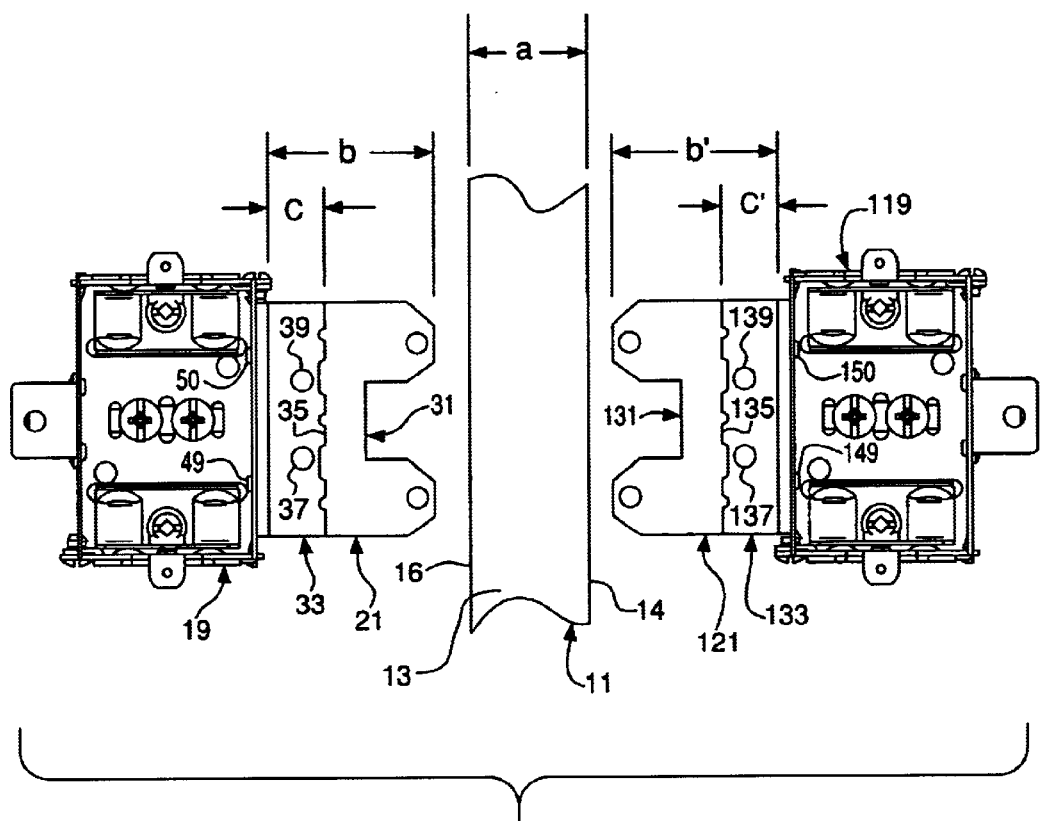
FIG. 4 is a front elevational, exploded view of first and second brackets according to the first embodiment of the present invention just prior to being attached to a support.

As shown in FIGS. 1, 2 and 4–7, a first bracket 21 according to a first embodiment of the present invention has a removable portion 31 so that a second bracket 121 also having a removable portion 131 maybe mounted laterally adjacent the first bracket on the same face 13 of a support 11 without overlapping portions once the removable portions have been separated from the first and second brackets.

Figure 5:
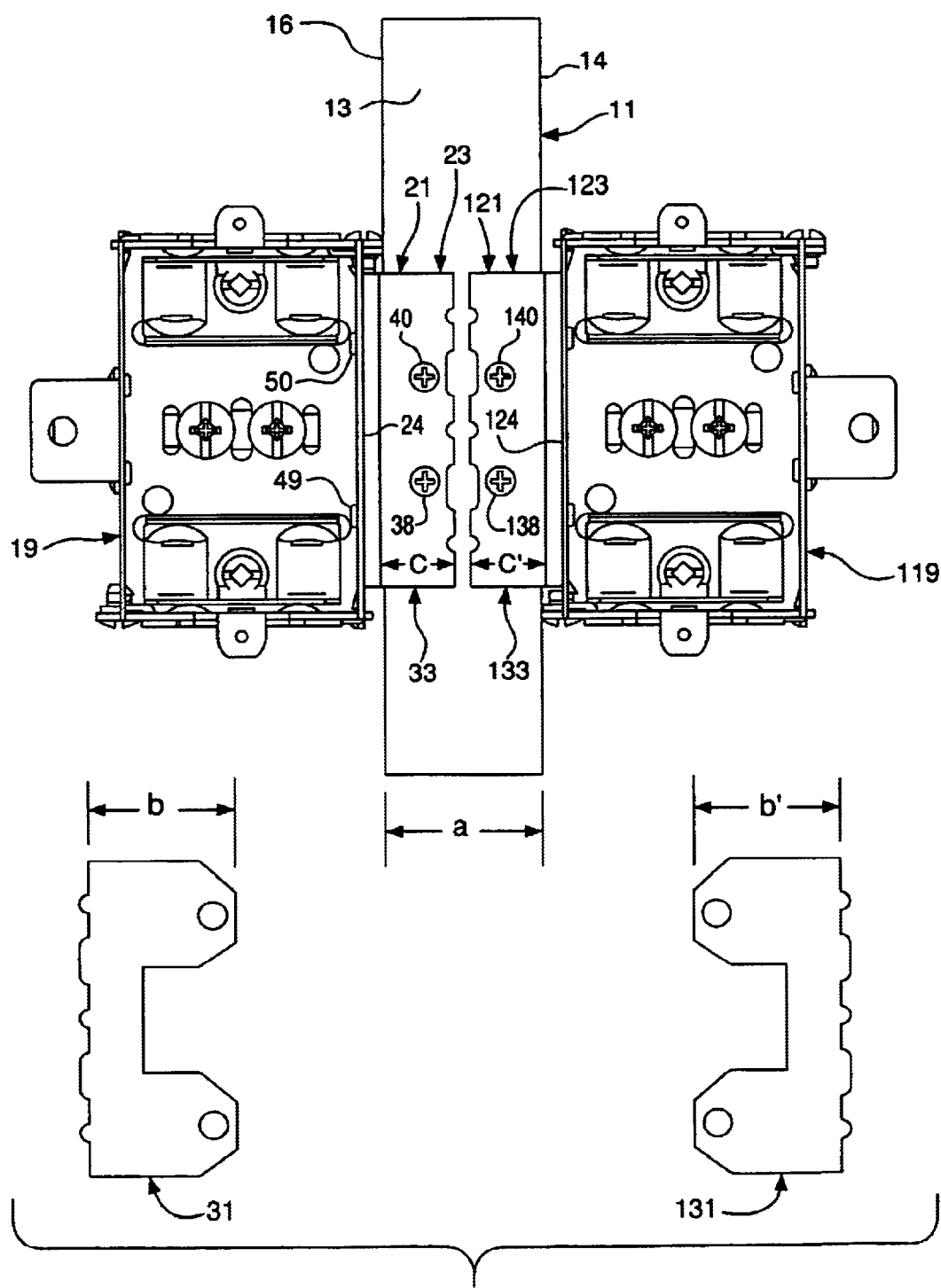
FIG. 5 is a front elevational view of the first and second brackets of FIG. 4 just after being attached to the support with the removable portions of the bracket detached from the non-removable portions.
Figure 6:
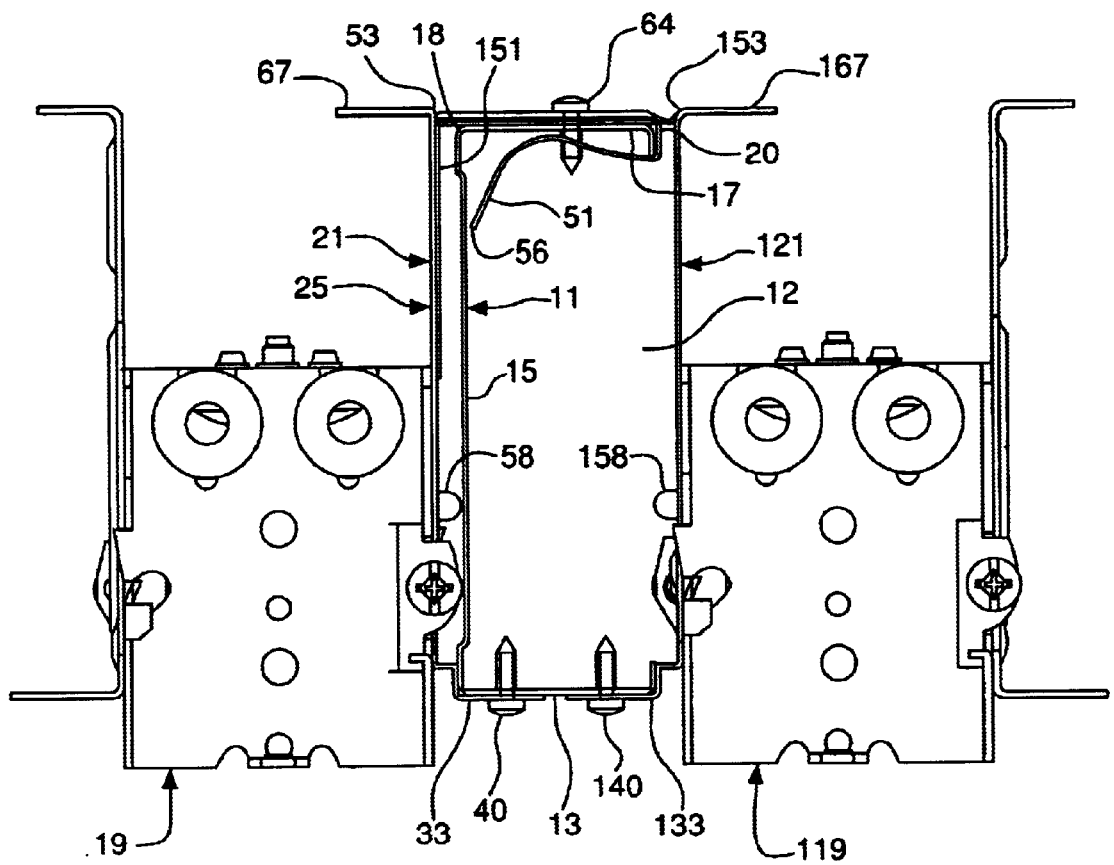
FIG. 6 is a top plan view of FIG. 5 showing the first and second brackets attached to the support.
Figure 7:
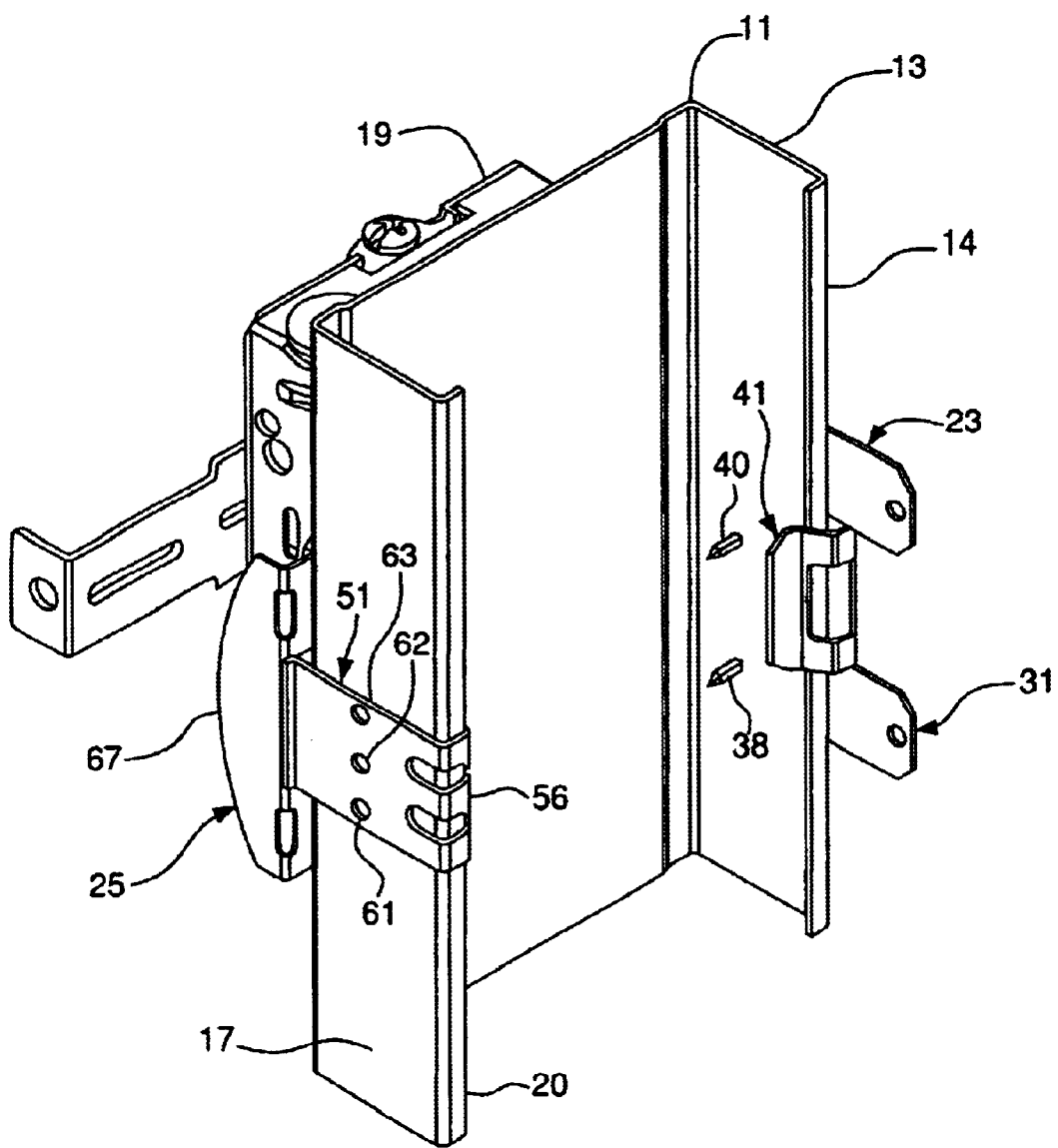
FIG. 7 is a perspective view from behind a support of one bracket according to the first embodiment of the present invention attached to the support, which shows the adjustable tab wrapped around the support.

The support 11, as shown in FIGS. 1 and 4–7, has a first face 13 to which the first bracket 21 and the second bracket 121 are attached. Generally, the support 11 is a steel stud that is substantially U-shaped. However, the support may be of any shape and made from any suitable material. The first face 13 of the support 11 has a first edge 14 and a second edge 16. The first face 13 has a width a, as shown in FIGS. 1, 4 and 5. The second face 15 of the support 11 extends substantially perpendicularly from the second edge 16 of first face 13. The third face 17 of the support extends substantially perpendicularly from a third edge 18 of the second face 15. The second face 15 of the support 11 is wider than the first and third faces 13 and 17, as shown in FIGS. 1 and 6–7.

Figure 8:
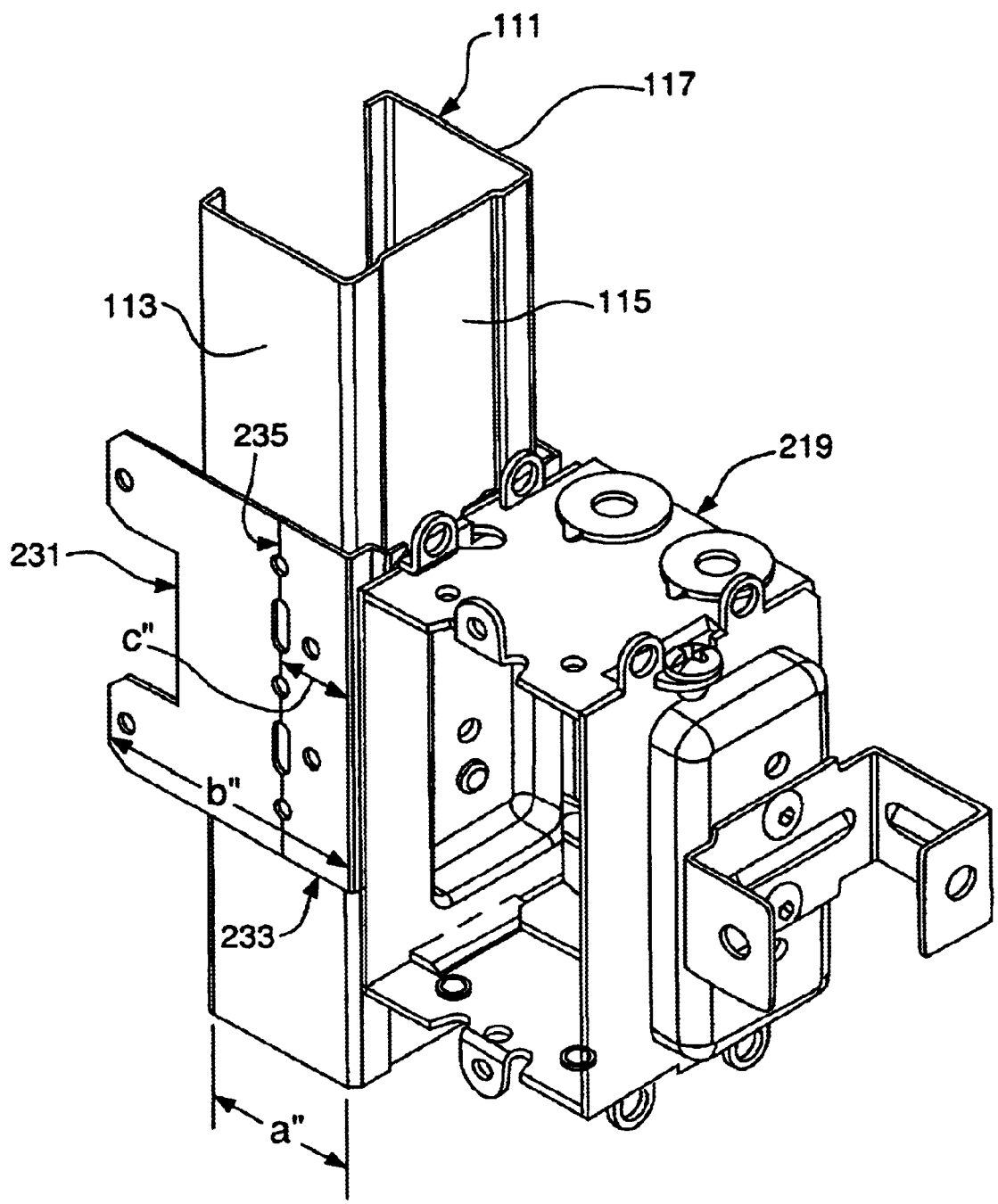
FIG. 8 is a perspective view from the front side of the bracket of FIG. 3 attached to a second configuration of a support.

A second support 111 is shown in FIG. 8. The second support 111 is substantially identical to support 11 of FIGS. 1 and 4–7 with a few minor differences, such as, but not limited to, the second face 115 being approximately the same width as the first and third faces 113 and 117.

The first bracket 21 according to the first embodiment of the present invention has a first leg 23 that has a second width b, as shown in FIGS. 2 and 4. The first leg 23 has a first removable portion 31 removably attached to a first non-removable portion 33. Preferably, the first removable portion 33 is removably attached to the non-removable portion 33 by a perforated line, a scored line 35 or a plurality of tabs, which is indicated by the dashed line 36 in FIG. 2. The first non-removable portion 33 has a fourth width c, which is less than one half of the first width a of the first face 13 of support 11. At least one first fastener hole 37 in the first non-removable portion 31 of the first leg 23 receives a fastener 38 to secure the first bracket 21 to the support 11, as shown in FIG. 1. As shown in FIG. 2, the first bracket 21 has two first fastener holes 37 and 39 in the first non-removable portion 33 of the first leg 23.

A first mounting member 41, or lateral strip, extends from the first removable portion 31 of the first leg 23 of the first bracket 21, as shown in FIG. 2. The mounting member is described in detail in U.S. Pat. No. 5,810,303, which is hereby incorporated by reference in its entirety. The mounting member 41 is substantially rectangular and has an opening 43. Preferably, the mounting member 41 is formed by two cuts 44 and 45 extending inwardly from an edge 43 of the removable portion 31. The mounting member 41 is then bent to a desired position, which, preferably, is substantially perpendicular to the removable portion 31. The mounting member facilitates maintaining the position of the first bracket 21 on the support 11 prior to installation of fasteners through the at least one first fastener holes in the non-removable portion 33 of the first leg 23.

A third leg 25 extends substantially perpendicularly from the first non-removable portion 33 of the first leg 23 of the first bracket 21, as shown in FIG. 2, such that the first bracket 21 is substantially L-shaped. An edge 24 is defined between the first leg 23 and the third leg 25. The third leg 25 has an outer perimeter 27. The third leg 25 of the first bracket 21 has at least one second fastener hole 47 for receiving a fastener 49 for securing a first electrical box 19 to the first bracket 21. Preferably, the third leg has two second fastener holes 47 and 48 for receiving fasteners 49 and 50 to secure the first electrical box 19 to the first bracket 21. Preferably, the third leg 25 is wider than the first leg 23.

A first mounting arm 51, or inner strip, is secured to the third leg 25 of the first bracket 21, as shown in FIGS. 1, 2 and 6–7, which is also fully described in U.S. Pat. No. 5,810,303. Initially, the mounting arm 51 is in a fist position that is coplanar with the third leg 25 and within the outer perimeter 27, as shown in FIG. 2. Preferably, the mounting arm 51 is formed by a continuous cut 52 made from a first point 54 of a fold line 53 within the outer perimeter 27 of the third leg 25 to a second point 55 of fold line 53. The fold line 53 is defined by the attachment of the mounting arm 51 to the third leg 25, and allows the mounting arm 51 to rotate about the fold line. Preferably, the cut 52 is substantially U-shaped. The mounting arm 51 is rotatable 180 degrees either clockwise or counter-clockwise from the initial position. Preferably, the mounting arm 51 is rotated to a second position, as shown in FIGS. 6 and 7, which is substantially perpendicular to the third leg 25. When the mounting arm 51 is moved to the second position, an opening 57 is formed in the third leg 25 that is defined by the continuous cut 52 and fold line 53, as shown in FIG. 7. The first mounting arm 51 is flexible so that the first bracket 21 is adapted to be secured to a variety of supports having different widths of the second face, e.g., support 11 of FIGS. 1, 6 and 7 and second support 111 of FIG. 8. A first foot 67 of the third leg 25 of the first bracket 21 is adapted to be rotated to form a support against a back wall (not shown).

Spacers 58 and 59 extend substantially perpendicularly from the third leg 25 of the first bracket 21, as shown in FIG. 2. The spacers 58 and 59 provide spacing between the second face 15 of the support 11 and the third leg 25 of the bracket 21.

The first bracket 21 is made of a flexible material, such as galvanized steel. Preferably, the first leg 23 and third leg 25 of the first bracket 21 is unitarily formed.

A second bracket 121 that is substantially identical to the first bracket 21 is adapted to be attached laterally adjacent the first bracket 21 on the first face 13 of a stud 11. The same reference numbers are used for the second bracket 121 as are used with the first bracket 21, except that the reference numbers for the second bracket are in the 100 series. Preferably, the second bracket 121 has a fourth leg 125 extending substantially perpendicularly from an edge 124 of the second leg 123. The second leg 123 has a width b' and the second non-removable portion 133 of the second leg has a width c', as shown in FIG. 5.

A first electrical box 19 maybe attached to the first bracket 21, as shown in FIGS. 1 and 2–7. Fastener holes (not shown) in the first electrical box 19 receive fasteners 49 and 50 to secure the first electrical box to the third leg 25 of the first bracket 21. A second electrical box 119 maybe attached to the second bracket 121 in the same manner.

Assembly and Disassembly

As shown in FIG. 4, the first bracket 21 (FIG. 2) and the second bracket 121 have first and second electrical boxes 19 and 119, respectively, attached thereto. Fasteners 49 and 50 secure the first electrical box 19 to the first bracket 21, and fasteners 149 and 150 secure the second electrical box 119 to the second bracket 121.

As shown in FIG. 7, the first bracket 21 is secured to the support 11. The first leg 23 of the first bracket 21 is positioned on the first face 13 of the support 11 such that the first leg overlies the support. The mounting member 41 is bent around edge 14 of the first face 13 to securely attach the first bracket to the support The mounting arm 51 is rotated approximately 90 degrees counter-clockwise from its first position to a second position that is substantially perpendicular to the third leg 25 of the first bracket, as shown in FIG. 7. The second position of the mounting arm 51 is substantially parallel to the first leg 23 and substantially perpendicular to the third leg 25. The mounting arm 51 is positioned on the third face 17 of the support 11. The end 56 of the mounting arm 51 is bent around edge 20 of the third face 17 to securely attach the first bracket 21 to the support 11. The end 56 of the mounting arm is contained within the area 12 defined by the first, second and third faces 13, 15, and 17 of the support 11, as shown in FIG. 6. The first foot 67 of the third leg 25 of the first bracket 21 is bent approximately 90 degrees counter-clockwise and provides support against a back wall (not shown). Once the mounting member 41 and the mounting arm 51 have secured the first bracket 21 to the support 11, fasteners 38 and 40 are inserted through fastener holes 37 and 39 in the first leg of the support to further secure the first bracket 21 to the support 11, as shown in FIG. 7.

Once the fasteners 38 and 40 have been inserted into the support 11, the first removable portion 31 of the first leg 23 of the first bracket 21 may be removed from the first non-removable portion 33. By repeatedly bending the first removable portion 31 about the score line 35 (FIG. 2), the first removable portion of the first leg 23 of the first bracket 21 separates from the first non-removable portion 33. Alternatively, the first removable portion 31 may be removed from the first bracket 21 before inserting fasteners 38 and 40 through fastener holes 37 and 39 to secure the first bracket to the support 11. The first removable portion 31 may then be discarded, as shown in FIG. 5. The width c of the non-removable portion 33 on the first face 13 of the support 11 is less than one half of the width a of the support 11, as shown in FIG. 5.

Since at least approximately one half of the width a of the first face of the support laterally adjacent the first bracket 21 is uncovered, the second bracket 121 may be attached laterally adjacent the first bracket without any overlapping portions between the first and second brackets on the first face 13 of the support 11, as shown in FIGS. 5 and 6. The second bracket 121 is installed in substantially the same manner as the first bracket 21. The second removable portion 131 of the second leg 123 of the second bracket 121 may be removed prior to securing the second bracket to the support, or it may be initially left attached to the second non-removable portion 133 and separated later, either before or after fasteners 138 and 140 are inserted through fastener holes 137 and 139 to further secure the second bracket 121 to the support 11.

After the second leg 123 of the second bracket 121 has been attached to the support 11, the second mounting arm 151 attached to the fourth leg 125 is rotated about fold line 153 approximately 90 degrees clockwise from its initial position to the second position, as shown in FIG. 6. In the second position, the second mounting arm 151 is substantially parallel to the second leg 123 and substantially perpendicular to the fourth leg 125. The second mounting arm 151 overlies the third face 17 of the support and the first foot 67 of the third leg 25 of the first bracket 21. One of the fastener holes 61, 62 or 63 in the third leg 25 and one of the corresponding fastener holes (not shown) in the fourth leg 125 may receive a fastener 64, as shown in FIG. 6, to further secure the first and second brackets 21 and 121 to the support 11. Second foot 167 of the second leg 125 of the second bracket 121 may be bent approximately 90 degrees clockwise to form a support against a back wall (not shown).

After the second removable portion 131 of the second bracket 121 has been separated from the second non-removable portion 133, as shown in FIG. 5, the first and second brackets are positioned laterally adjacent one another on the first face 13 of the support 11 without any overlapping portions on the first face of the support. Furthermore, the score lines 35 and 135 allows for easy separation of the removable portions 31 and 131 from the brackets 21 and 121 without the installer having to resort to manually cutting or trimming the brackets to prevent overlapping portions. This provides first and second electrical boxes 19 and 119 that are adapted to be mounted adjacent one another on opposite faces of the support 11. No special attention is required when dry wall is installed as there are no raised portions on the support due to overlapping brackets on the first face of the support.

Second Embodiment

A second embodiment of the bracket 221 is shown in FIGS. 3 and 8. The second embodiment of the bracket 221 is substantially identical to the first bracket 21 with the exception that the bracket 221 does not have a mounting arm on the third leg 225. The first leg 223 has a width b" and the non-removable portion 233 has a width c".

The attachment of a first bracket 221 according to a second embodiment of the present invention to a support is substantially identical to a bracket according to a first embodiment of the present invention. Mounting member 241 facilitates securing the first bracket 221 to the support while fasteners are inserted through fastener holes 237 and 239. Removable portion 231 is separated along score line 235 from the non-removable portion 233 of the first leg 223 of the bracket 221. A second bracket may then be attached laterally adjacent the first bracket on the first face 113 of the support 111 without any overlapping portions on the first face and without the installer having to resort to tools to manually cut either bracket to prevent any overlapping portions.

The brackets of the first and second embodiments may be used interchangeably. The first bracket may correspond to either the first or second embodiment of the bracket and the second bracket may correspond to either the first or second embodiment of the bracket.

While advantageous embodiments have been chosen to illustrate the invention, it will be understood by those skilled in the art that various changes and modifications may be made therein without departing from the scope of the invention as defined in the appended claims.

What is claimed is:

1. A bracket assembly, comprising:
   a first bracket attached to a support having a face having a first width (a), said first bracket having a first unitarily formed leg having a first removable portion and a first non-removable portion and having a second width (b) that is larger than one half of the first width (a), said first removable portion being removable from said first non-removable portion;
   a second bracket attached to the support, said second bracket having a second unitarily formed leg having a second removable portion and a second non-removable portion and also having a third width (b') that is larger than one half of the first width (a), said second removable portion being removable from said second non-removable portion; and said first and second non-removable portions having fourth and fifth widths (c) and (c'), respectively, that are less than one half of the first width (a) of the support for positioning said first non-removable portion of said first leg of said first bracket laterally adjacent said second non-removable portion of said second leg of said second bracket on the face of the support when said first and second removable portions have been separated from said first and second brackets.

2. The bracket assembly according to claim 1, wherein each of said first and second brackets are comprised of steel.

3. The bracket assembly according to claim 1, wherein each of said first and second non-removable portions has at least one fastener hole.

4. The bracket assembly according to claim 1, wherein a third leg extends substantially perpendicularly from said first leg; and
a fourth leg extends substantially perpendicularly from said second leg.

5. The bracket assembly according to claim 4, wherein second width (b) is substantially equal to third width (b'); and
fourth width (c) is substantially equal to fifth width (c').

6. The bracket assembly according to claim 5, wherein each of said first and second non-removable portions has at least one first fastener hole for receiving a first fastener for securing each of said brackets to the support.

7. The bracket assembly according to claim 6, wherein each of said third and fourth legs has at least one second fastener hole for receiving a second fastener for securing each of said brackets to the support.

8. The bracket assembly according to claim 1, wherein each of said removable portions is removably attached to each of said non-removable portions by a perforated line, a score line or a plurality of tabs.

9. The bracket assembly according to claim 1, wherein a member extends substantially perpendicularly from each of said first and second removable portions for mounting each of said first and second brackets to the support.

10. The bracket assembly according to claim 1, wherein an arm extends substantially perpendicularly from each of said third and fourth legs of each of said first and second brackets.

11. The bracket assembly according to claim 10, wherein said arm is movable between a first position flush with each of said third and fourth legs and a second position perpendicular to each of said third and fourth legs.

12. The bracket assembly according to claim 11, wherein said arm has at least one fastener hole for receiving a fastener for securing said bracket to the stud.

13. The bracket assembly according to claim 1, wherein each of said first and second brackets is made of a flexible material.

14. A bracket assembly, comprising:
a first bracket including
 a first leg having removable and non-removable portions and said first leg having a second width (b), said non-removable portion having a third width (c), said removable portion being removable from said non-removable portion;
 a third leg extending substantially perpendicularly from said first leg;
 a first arm unitarily formed with and pivotally attached to said third leg and movable between first and second positions, said first position being flush with said third leg and said second position being substantially perpendicular to said third leg; and
 at least one first fastener hole in said first leg for receiving a first fastener for securing said bracket to a support having a first width (a); and
whereby said second width (b) is larger than one half of the first width (a) and said third width (c) is less than one half of the first width a such that a second bracket is attachable to the support laterally adjacent said first bracket after separating said removable portion from the first bracket.

15. The bracket assembly according to claim 14, wherein said third leg has an outer perimeter within which said first arm is positioned when in said first position.

16. The bracket assembly according to claim 14, wherein a first member extends substantially perpendicularly from said first leg to facilitate securing said bracket to the support.

17. The bracket according to claim 14, wherein said third leg has at least one second fastener hole for receiving a second fastener for securing said bracket to the support.

18. The bracket according to claim 14, wherein said bracket is comprised of steel.

19. The bracket according to claim 14, wherein said bracket is made of a flexible material.

20. The bracket according to claim 14, wherein said removable portion of said first leg is attached to said non-removable portion by a perforated line, a score line or a plurality of tabs.

21. The bracket according to claim 14, wherein said first arm has at least one third fastener hole for receiving a third fastener for securing said bracket to the support.

22. The bracket assembly according to claim 14, wherein a second bracket attachable laterally adjacent said first bracket, said second bracket including
 a second leg having removable and non-removable portions and having a third width (b'), said non-removable portion having a fifth width (c');
 a fourth leg extending substantially perpendicularly from said first leg;
 a second arm pivotally attached to said fourth leg and movable between first and second positions, said first position being flush with said fourth leg and said second position being substantially perpendicular to said fourth leg; and
 at least one first fastener hole in said second leg for receiving a first fastener for securing said bracket to a support having a first width a laterally adjacent said first bracket.

23. The bracket assembly according to claim 22, wherein second width (b) is substantially equal to third width (b'); and
fourth width (c) is substantially equal to fifth width (c').

24. A method of attaching brackets adjacent one another to a face of a support, comprising the steps of:
removing a first removable portion from a first non-removable portion of a first unitarily formed leg of a first bracket, the first leg of the first bracket having a second width (b) and the first non-removable portion of the first leg of the first bracket having a fourth width (c) less than one half of a first width (a) of the face of the support;

attaching the first bracket to the support;

removing a second removable portion from a second non-removable portion of a second leg of a second bracket, the second leg having a third width (b') and the second non-removable portion of the second bracket having a fifth width (c') less than one half of the first width (a) of the face of the support; and attaching the second bracket to the support such that the second non-removable portion of the second leg of the second bracket is positioned laterally adjacent the first non-removable portion of the first leg of the first bracket on the face of the support.

25. The method according to claim 24, further comprising wrapping a third leg of the first bracket around the support; and wrapping a fourth leg of the second bracket around the support.

26. The method according to claim 24, wherein attaching the first bracket to the support comprises attaching the first non-removable portion of the first leg of the first bracket to the face of the support; and attaching the second bracket to the support comprises attaching the second non-removable portion of the second leg of the second bracket to the face of the support.

27. The method of claim 24, wherein the second width (b) is substantially equal to third width (b'); and the fourth width (c) is substantially equal to fifth width (c').

\* \* \* \* \*